United States Patent
Bridges et al.

(10) Patent No.: US 8,831,772 B2
(45) Date of Patent: Sep. 9, 2014

(54) LIFT APPARATUS FOR STABLE PLACEMENT OF COMPONENTS INTO A RACK

(75) Inventors: Jeremy S. Bridges, Apex, NC (US); Michael DeCesaris, Carrboro, NC (US); Luke D. Remis, Raleigh, NC (US); Gregory D. Sellman, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 100 days.

(21) Appl. No.: 13/557,357

(22) Filed: Jul. 25, 2012

(65) Prior Publication Data

US 2014/0031971 A1    Jan. 30, 2014

(51) Int. Cl.
*G06F 7/00* (2006.01)
*G06F 17/50* (2006.01)

(52) U.S. Cl.
USPC ........... 700/214; 700/213; 700/217; 700/218; 700/220; 703/1

(58) Field of Classification Search
None
See application file for complete search history.

(56) References Cited

U.S. PATENT DOCUMENTS

| | | | |
|---|---|---|---|
| 4,007,843 A | 2/1977 | Lubbers et al. | |
| 4,820,101 A | 4/1989 | Fenn | |
| 5,222,855 A | 6/1993 | Bernard, II et al. | |
| 5,362,197 A | 11/1994 | Rigling | |
| 5,850,539 A * | 12/1998 | Cook et al. | 703/20 |
| 5,993,045 A | 11/1999 | Schmidtke et al. | |
| 6,332,098 B2 | 12/2001 | Ross et al. | |
| 6,378,119 B1 * | 4/2002 | Raves | 716/54 |
| 7,286,969 B2 * | 10/2007 | Shahoumian et al. | 703/1 |
| 7,857,214 B2 * | 12/2010 | Saliaris | 235/383 |
| 2008/0281717 A1 | 11/2008 | Kortelainen | |
| 2010/0316468 A1 | 12/2010 | Lert et al. | |
| 2010/0316469 A1 | 12/2010 | Lert et al. | |
| 2010/0316470 A1 | 12/2010 | Lert et al. | |
| 2011/0020098 A1 | 1/2011 | Pfaffmann | |

OTHER PUBLICATIONS

Binar, "Quick-Lift Systems", http://www.kahlman.se/uk/default.asp, Mar. 5, 2012, 1 Page.

* cited by examiner

*Primary Examiner* — Yolanda Cumbess
(74) *Attorney, Agent, or Firm* — Katherine S. Brown; Jeffrey L. Streets

(57) ABSTRACT

A method uses scales onboard a lift apparatus to weigh an uninstalled component that is positioned on the lift apparatus for installation into a rack. Data is accessed that identifies the weight and rack location of components currently installed in the rack, and one or more available rack locations are identified where the component may be installed without violating one or more predetermined rack stability rules. The method then uses the lift apparatus to raise the component into a selected one of the one or more available rack locations. The components are preferably information technology components, such as servers, network switches and power distribution units.

17 Claims, 3 Drawing Sheets

LIFT APPARATUS FOR STABLE PLACEMENT OF COMPONENTS INTO A RACK

BACKGROUND OF THE INVENTION

1. Field of the Invention

The present invention relates to the installation of information technology equipment in an appropriate position within a rack.

2. Background of the Related Art

When an entity uses more than a few units of information technology equipment (ITE), such as computer servers, switches and power distribution units, those ITEs are commonly supported and operated in racks. These racks provide physical support for each ITE while maintaining accessibility for use and maintenance. These racks also accommodate the provisioning of power, the communication of data, and the cooling of heat that emanates from the ITEs.

Giving due consideration to the totality of ITEs and other components in and of the rack, it is possible to position each component within the rack such that the rack remains stable. One simple measure of rack stability is a determination of the rack's center of gravity. If the rack's center of mass is higher than a predetermined height, then the rack may become unbalanced and vulnerable to tipping. The actual limitations on the configuration or loading of a rack may be described by a set of best practices distributed by the rack manufacturer or the systems integrator.

If a rack is being fully populated or loaded, the rack configuration may be determined in consideration of all of the components that need to go into the rack. For example, the heavier components may be positioned in the lower portions of the rack. However, a rack may also receive one component at a time as a system is gradually expanded, modified or upgraded. Without knowing what other components will eventually fill the rack, the rack should remain stable after each additional component is installed.

BRIEF SUMMARY OF THE INVENTION

One embodiment of the present invention provides a method comprising using scales onboard a lift apparatus to weigh the uninstalled component that is positioned on the lift apparatus for installation into a rack. The method further comprises accessing data that identifies the weight and rack location of components currently installed in the rack, and determining one or more available rack locations where the component may be installed without violating one or more predetermined rack stability rules. The method then uses the lift apparatus to raise the component into a selected one of the one or more available rack locations.

DETAILED DESCRIPTION OF THE INVENTION

Figure 1:
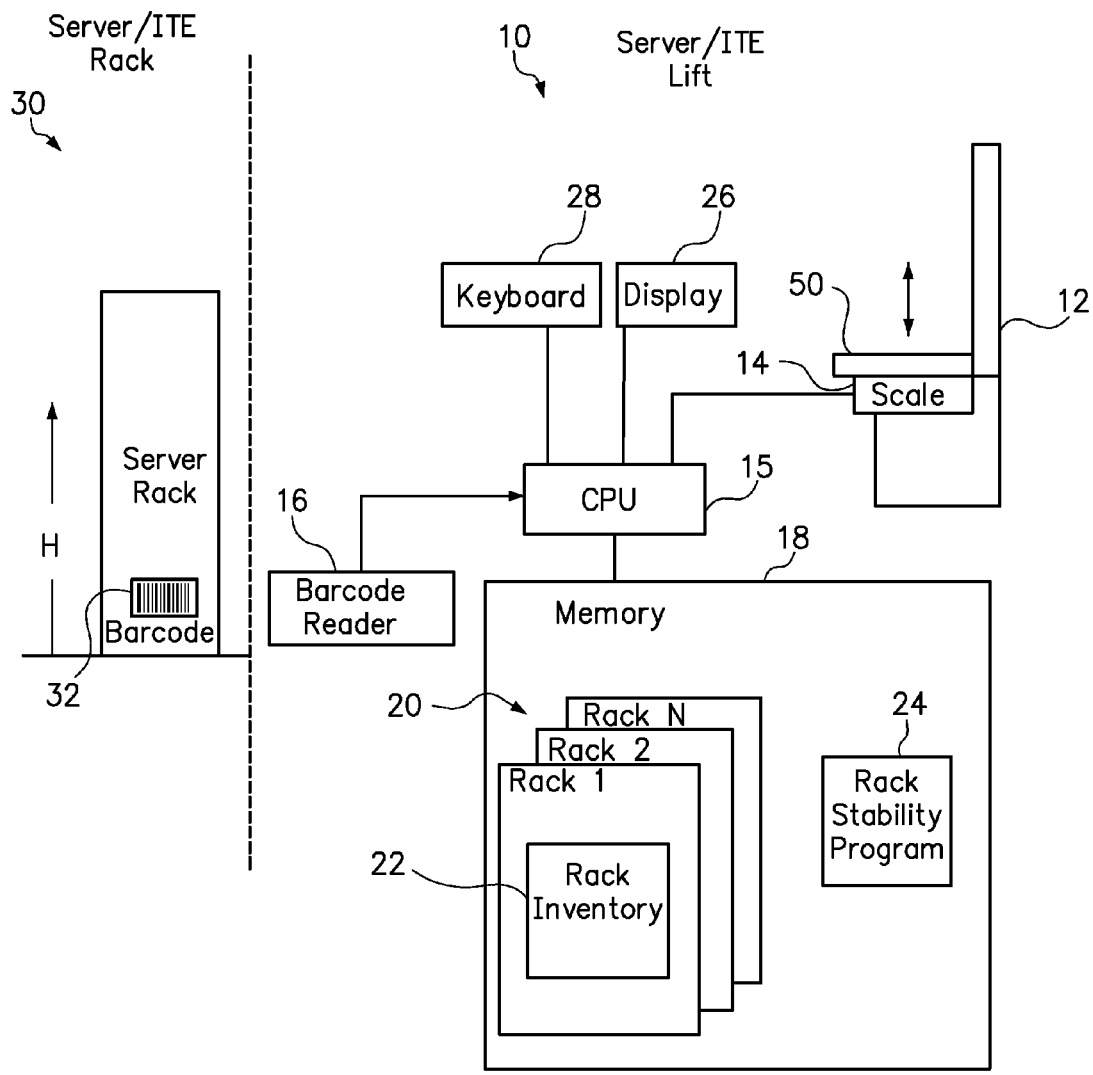
FIG. 1 is a diagram of a first lift apparatus capable of monitoring rack stability during installation of a component, such as a server, network switch or power distribution unit.

One embodiment of the present invention provides a method comprising using scales onboard a lift apparatus to weigh the uninstalled component that is positioned on the lift apparatus for installation into a rack. The method further comprises accessing data that identifies the weight and rack location of components currently installed in the rack, and determining one or more available rack locations where the component may be installed without violating one or more predetermined rack stability rules. The method then uses the lift apparatus to raise the component into a selected one of the one or more available rack locations.

The scales are preferably built into a horizontal lift platform upon which components are placed. In this manner, the act of weighing the component is performed by the lift apparatus without any additional act of the user. It is also advantageous that the scales weigh the actual component that is about to be lifted into position and installed.

The data that identifies the weight and rack location of the components currently installed in the rack may be maintained and stored in association with the lift apparatus or a rack management module. That rack location may be a vertical height measurement relative to the base of the rack or an indicator that is representative of height, such as a bay number. Optionally, the data may further include the size of the unit, such as 1U, 2U, etc., and/or a slide out distance that the unit might extend out of the rack for use or maintenance.

In embodiments where the data is maintained by a rack management module, the lift apparatus communicates with the rack management module in order to access the data. The communication may use a wireless protocol or a USB cable, and the communication may conform to a short range peer to peer network. However, having the management module maintain this data may be advantageous in some circumstances. For example, if one or more components have been replaced without the use of the lift apparatus (either by hand or with another unit of lift apparatus), the management module should be able to detect this change and update the data. In other embodiments, the data is maintained by a computer that is onboard the lift apparatus and stored in an onboard computer readable medium. Still, if the computer maintains component inventory data for a plurality of racks, such as those in a datacenter, the computer needs to identify the particular rack in which the component is to be installed. Although the user could make a manual entry into the computer through a keyboard, a convenience manner of identifying the rack is to associate component inventory of each rack with a barcode that is physical secured to the rack. Accordingly, a barcode scanner in communication with the onboard computer may scan the barcode and thus identify the rack and use the appropriate data in the determination of rack location availability and rack stability. Alternatively, the barcode may be substituted with a radio frequency identification (RFID) tag, and the lift apparatus may be equipped with a RFID reader. For any circumstance where the data is incomplete, the user may manually enter the weight of a previously installed unit or enter a serial number of a component that may be cross-referenced to the weight of the component. A still further option, where the lift apparatus and rack management module are in communication, includes each bay in the rack having a scale that measures the weight of the component that is installed there, such that the management module can then communicate the weight and rack location data to the lift apparatus.

In another embodiment, input is received from a user identifying a user-proposed rack location for the component to be installed. The method then determines whether the installation of the component in the user-proposed location would violate the one or more predetermined rack stability rules. Optionally, the lift apparatus may be prevented from lifting the component to a position that would violate the one or more predetermined rack stability rules. It is also an option to output an alert to the user that installing the component in the user-proposed location would violate the one or more predetermined rack stability rules.

In yet another embodiment, the method may identify all of the available locations in the rack where the component can be installed without violating one or more predetermined rack stability rules, and then output a list of all of the identified locations. The user may then select one of the identified locations from the list. Since the list identifies locations that satisfy stability requirements, the user may then select which of those locations best satisfy their usability requirements. For example, the user may prefer that a component with a slide out keyboard tray be installed in a location that is about waist high.

The one or more predetermined rack stability rules may, for example, require that the center of mass for the combination of the rack and its installed component should not exceed a predetermined height. Alternative stability rules and alternative manners of calculating stability may be implemented as well. The methods of the present invention are not limited to any particular calculation for determining physical stability of the rack. Furthermore, the method may consider compliance with one or more component manufacturer rules about the proper installation of a component, such as a server.

In a further option, the method may include storing the component weight and rack location (for the newly installed component) in the database in response to installing the component. The component to be installed is preferably a unit of information technology equipment, such as a server, a network switch, or a power distribution unit. A rack will typically support a combination of these units and other types of units, including peripherals, cables and computer readable storage devices.

FIG. 1 is a diagram of a lift apparatus 10 that is capable of monitoring the stability of a rack 30 during installation of a component 50, such as a server. The lift apparatus 10 can be easily moved from one rack to another, and includes a lift mechanism 12 that is made to lift the component 50 vertically. The component 50 is placed on a platform 14 and lifted to an appropriate height H relative to the rack 30 for installation of the component into the rack. According to embodiments of the present invention, the platform 14 has a built-in scale for weighing the component.

With the lift apparatus 10 positioned in front of a selected rack where the component 50 is to be installed, the CPU 15 causes a barcode reader 16 to read a barcode 32 that is physically secured to the rack. Each barcode 32 is used to uniquely identify the rack from among a plurality of N racks in a hypothetical datacenter. A computer readable memory 18 stores data 20, include a record for each of the plurality of N racks. Each of the N rack records includes a rack inventory 22 that provides the current weight distribution in a given rack. For example, the rack inventory 22 for a given rack may include the weight and rack location of each component. Although it is not strictly necessary for the rack inventory to identify the type of component or provide a unique component ID, such fields may be included in the data. The rack inventory 22 may further include the size of the component, such as 1U, 2U and the like, and an indication whether the component is mounted on a slide for use or maintenance.

Once the lift apparatus 10 has used the barcode reader 16 to read the barcode 32 identifying the rack, located the relevant rack inventory 22 in the data 20, and used the scale in the platform 14 to weigh the component, then the lift apparatus 10 has the information needed for the rack stability program 24. In one embodiment, the rack stability program 24 determines, and outputs to a user (perhaps via the display 26 or other output device), which of the available rack locations, if any, can receive the component without violating one or more predetermined rack stability rules. Optionally, the lift mechanism 12 is automatically prevented from lifting the component into a rack location that would result in a violation of the one or more predetermined rack stability rules. In an alternative embodiment, the user (perhaps using the keyboard 28 or other input device) inputs a desired rack location for installing the component 50 and the rack stability program 24 determines whether or not installing the component in the desired rack location would violate one or more of the rack stability rules. A hypothetical rack stability rule might require that the center of mass of the rack, in consideration of all current rack components as well as the component 50 that is proposed for installation, should not be higher than one half the full height of the rack 30. If the rack is eight feet tall, then no component should be installed in the rack in a location that would result in the center of mass being higher than four feet above the base of the rack.

Figure 2:
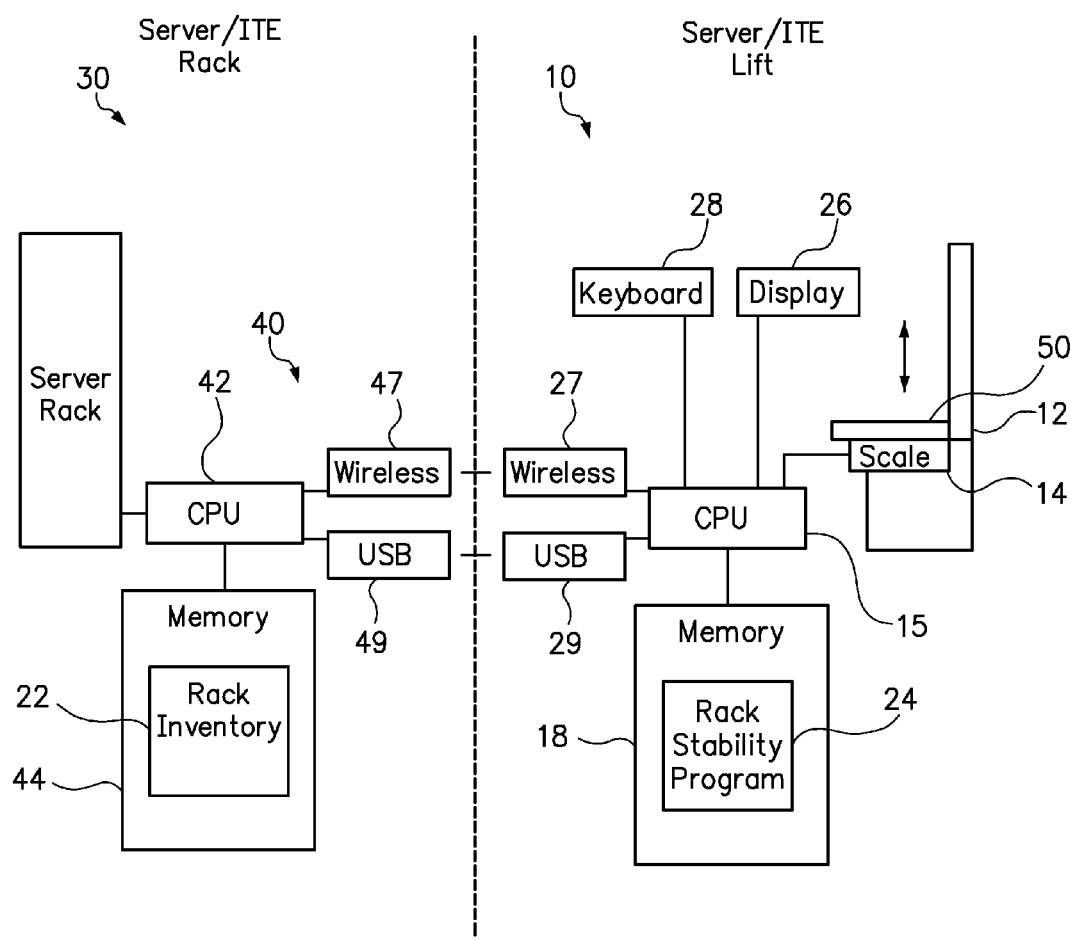
FIG. 2 is a diagram of a lift apparatus capable of monitoring rack stability during installation of a component.

FIG. 2 is a diagram of the lift apparatus 10 and rack 30 of FIG. 1, except that the rack inventory 22 for the rack 30 is maintained by a management module 40 associated with the rack. The management module 40 includes a CPU 42 that receives data identifying each of the components currently installed in the rack 30. The CPU 42 stores this data as a rack inventory 22 in memory 44. When a component 50 is placed on the platform 14 and the lift apparatus 10 is positioned in front of a rack, the CPU 15 of the lift apparatus uses either a wireless device 27 or a USB port/cable 29 to communicate with a wireless device 47 or a USB port/cable 49, respectively, of the rack management module 40. The lift apparatus 10 may thus request that the rack management module 40 provide the rack inventory data 22, or some information representative of the rack inventory data (such as the current center of mass, the current total mass, and a list of available locations). Then, the CPU 15 has access to all the same data as in the previous embodiment of FIG. 1 and is able to use the rack stability program 24 to identify rack locations, if any, where the component 50 may be installed without violating one or more predetermined rack stability rules. Alternatively, if a user requests installation of the component in a given location of the rack, then the rack stability program 24 may determine whether or not the component 50 may be installed in the given location without violating one or more predetermined rack stability rules.

Figure 3:
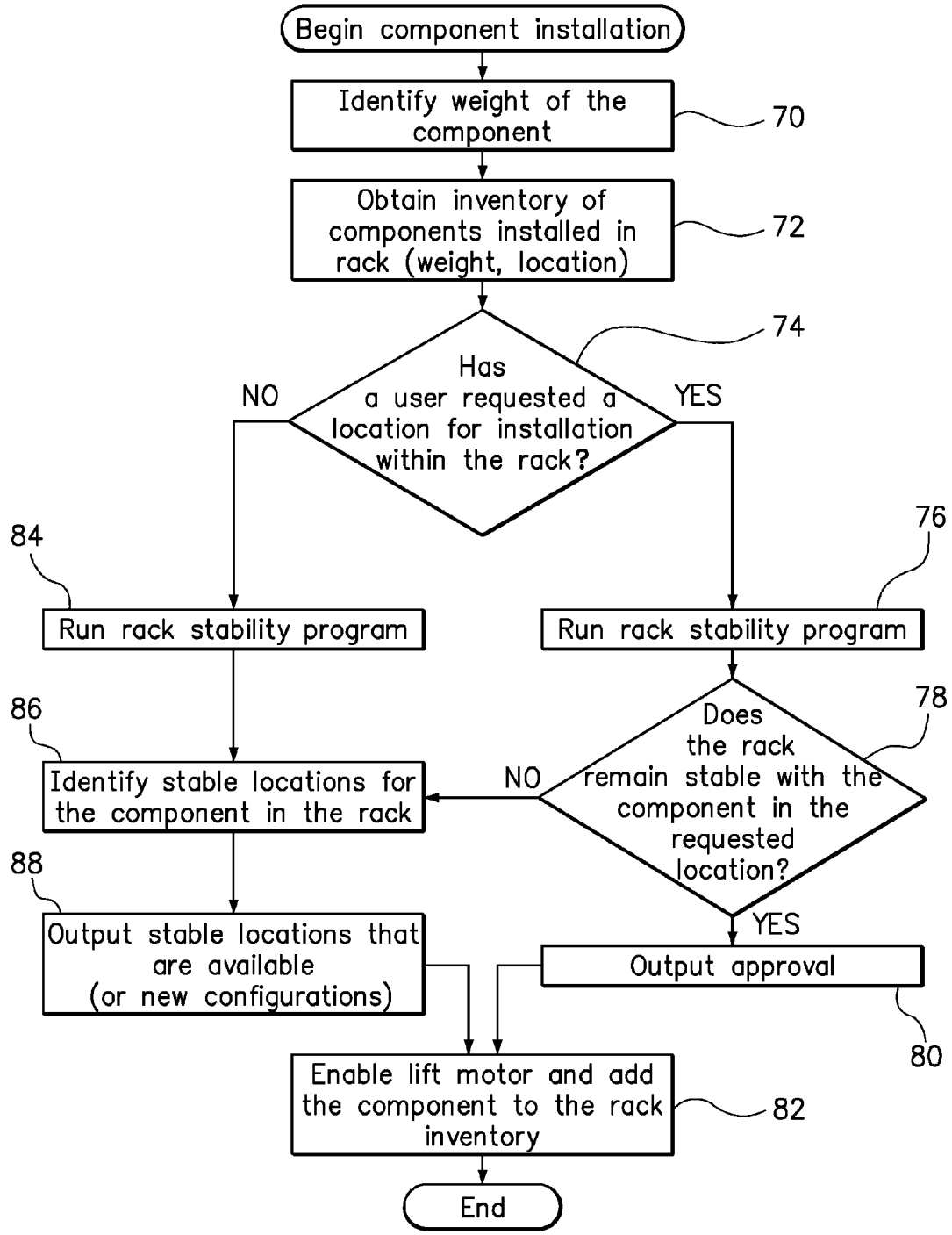
FIG. 3 is a flowchart of a method of maintaining rack stability during installation of a component.

FIG. 3 is a flowchart of a method of maintaining rack stability during installation of a component. After the method begins, the method identifies the weight of the ITE in step 70. In step 72, the method obtains an inventory of components currently installed in the rack, where the rack inventory includes the weight and rack location of each component. Then, in step 74, it is determined whether a user has requested a location for installation within the rack. If the user has requested a given location, then the method proceeds to step 76 to run the rack stability program, which in step 78 determines whether the rack will remain stable (i.e., will not violate one or more rack stability rules) with the component installed in the requested location of the rack. If the rack would remain stable, then an approval message is output to the user in step 80 and the lift motor is enabled for lifting to the requested location and the component is added to the rack inventory.

Referring back to step 74, if the user does not request a location for installation within the rack, then the method proceeds to run the rack stability program in step 84 and identify stable locations (i.e., locations that will not violate one or more rack stability rules) for the component to be installed in the rack in step 86. Similarly, if use had requested a given location in step 74, but the given location would be stable per step 78, then the stable locations may also be identified in step 86. In either situation, step 88 outputs the stable locations to the user, perhaps using a display. Still further, if there are available locations in the rack but none of those locations would be stable, then the method may output proposed new configurations or rearrangements of the currently installed components in order to accommodate the new component.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   using scales onboard a lift apparatus to weigh an uninstalled component that is positioned on the lift apparatus for installation into a rack;
   accessing data that identifies the weight and rack location of components currently installed in the rack;
   determining one or more available rack locations where the uninstalled component may be installed without violating one or more predetermined rack stability rules; and
   activating the lift apparatus to raise the uninstalled component into a selected one of the one or more available rack locations.

2. The method of claim 1, wherein the step of accessing data that identifies the weight and rack location of the components currently installed in the rack comprises:
   the lift apparatus communicating with a rack management module to access data managed by the rack management module.

3. The method of claim 2, wherein the rack management module maintains a database identifying the components currently installed in the rack.

4. The method of claim 2, wherein the lift apparatus communicates with the rack management module using a wireless protocol.

5. The method of claim 2, wherein the lift apparatus communicates with the rack management module over a short range peer to peer network.

6. The method of claim 1, wherein the step of determining one or more available rack locations where the uninstalled component may be installed without violating one or more predetermined rack stability rules comprises:
   receiving input identifying a user-proposed rack location for the uninstalled component; and
   determining whether the installation of the uninstalled component in the user-proposed location would violate the one or more predetermined rack stability rules.

7. The method of claim 6, further comprising:
   preventing the lift apparatus from lifting the uninstalled component to a position that would violate the one or more predetermined rack stability rules.

8. The method of claim 6, further comprising:
   outputting an alert to the user that installing the uninstalled component in the user-proposed location would violate the one or more predetermined rack stability rules.

9. The method of claim 1, wherein the step of determining one or more available locations where the uninstalled component may be installed without violating one or more predetermined rack stability rules comprises:
   identifying all of the available locations in the rack where the uninstalled component can be installed without violating one or more predetermined rack stability rules; and
   outputting a list of all of the identified locations.

10. The method of claim 1, wherein the one or more predetermined rack stability rules require that the center of mass for the combination of the rack and its installed component should not exceed a predetermined height.

11. The method of claim 1, wherein the step of accessing data that identifies the weight and rack location of the components currently installed in the rack comprises:
   the lift apparatus accessing a database in an onboard computer readable storage medium.

12. The method of claim 11, further comprising:
   identifying the rack where the uninstalled component is to be installed by reading a barcode secured to the rack.

13. The method of claim 11, further comprising:
   storing the uninstalled component weight and rack location in the database in response to installing the uninstalled component.

14. The method of claim 1, wherein the uninstalled component is a unit of information technology equipment.

15. The method of claim 14, wherein the unit of information technology equipment is a server.

16. The method of claim 14, wherein the unit of information technology equipment is a network switch.

17. The method of claim 14, wherein the unit of information technology equipment is a power distribution unit.

* * * * *